US007952215B2

(12) United States Patent
Hayashi et al.

(10) Patent No.: US 7,952,215 B2
(45) Date of Patent: May 31, 2011

(54) WIND TURBINE GENERATOR, WIND TURBINE GENERATOR SYSTEM, AND POWER GENERATION CONTROL METHOD OF WIND TURBINE GENERATOR

(75) Inventors: Yoshiyuki Hayashi, Nagasaki (JP); Masaaki Shibata, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 42 days.

(21) Appl. No.: 12/447,505

(22) PCT Filed: May 14, 2008

(86) PCT No.: PCT/JP2008/058858
§ 371 (c)(1), (2), (4) Date: May 29, 2009

(87) PCT Pub. No.: WO2008/146604
PCT Pub. Date: Dec. 4, 2008

(65) Prior Publication Data
US 2010/0066087 A1    Mar. 18, 2010

(30) Foreign Application Priority Data

May 25, 2007  (JP) ................................ 2007-139429

(51) Int. Cl.
*F03D 13/00*  (2006.01)
(52) U.S. Cl. ........................................... 290/44; 290/55
(58) Field of Classification Search .................... 290/43, 290/44, 54, 55; 322/37
See application file for complete search history.

(56) References Cited

U.S. PATENT DOCUMENTS

| | | | | |
|---|---|---|---|---|
| 4,189,648 | A * | 2/1980 | Harner | 290/44 |
| 6,940,185 | B2 * | 9/2005 | Andersen et al. | 290/44 |
| 7,317,260 | B2 * | 1/2008 | Wilson | 290/44 |
| 7,342,323 | B2 * | 3/2008 | Avagliano et al. | 290/55 |
| 7,417,332 | B2 * | 8/2008 | Malakhova et al. | 290/44 |
| 7,423,352 | B2 * | 9/2008 | Suryanarayanan et al. | 290/55 |
| 7,425,774 | B2 * | 9/2008 | Shibata et al. | 290/55 |
| 7,436,083 | B2 * | 10/2008 | Shibata et al. | 290/44 |
| 7,692,322 | B2 * | 4/2010 | Wakasa et al. | 290/44 |

FOREIGN PATENT DOCUMENTS

JP    11-159436 A    6/1999
(Continued)

*Primary Examiner* — Nicholas Ponomarenko
(74) *Attorney, Agent, or Firm* — Kanesaka Berner and Partners LLP (57) ABSTRACT

To provide a wind turbine generator, a wind turbine generator system, and a power-generation control method of a wind turbine generator that are capable of improving the power-generation capability and reducing the fatigue load on the windmill. A data accumulation unit 25 sequentially accumulates data sets of a generated output power P during operation of the wind turbine generator, an incoming wind speed Ws estimated on the basis of a wind speed measured at the anemometer, and a wind direction deviation, which is the difference between a wind direction θw measured at the anemoscope and the orientation of the nacelle; statistical analysis of the data accumulated is carried out by an analyzing unit 26; a distribution curve corresponding to the wind direction deviation of the generated output power at each incoming wind speed is determined; the wind direction deviation corresponding to the peak of the distribution curve is set as a correction value θd of the anemoscope; the correction value of the anemoscope for each incoming wind speed is stored in the wind-direction correction table 27; the wind direction Vw measured at the anemometer is corrected with the correction value θd of the anemoscope for each incoming wind speed Ws; and power-generation control is carried out using the corrected wind direction as a control parameter.

8 Claims, 6 Drawing Sheets

FOREIGN PATENT DOCUMENTS

| | | |
|---|---|---|
| JP | 2003-028045 A | 1/2003 |
| JP | 2004-530076 A | 9/2004 |
| JP | 2005-098181 A | 4/2005 |
| JP | 2005-214066 A | 8/2005 |

* cited by examiner

WIND TURBINE GENERATOR, WIND TURBINE GENERATOR SYSTEM, AND POWER GENERATION CONTROL METHOD OF WIND TURBINE GENERATOR

CROSS-REFERENCE TO RELATED APPLICATIONS

The present Application is based on International Application No. PCT/JP2008/058858, filed on May 14, 2008, which in turn corresponds to Japanese Application No. 2007-139429 filed on May 25, 2007, and priority is hereby claimed under 35 USC §119 based on these applications. Each of these applications are hereby incorporated by reference in their entirety into the present application.

TECHNICAL FIELD

The present invention relates to a wind turbine generator, a wind turbine generator system, and a power generation control method of a wind turbine generator, and, more specifically, relates to a wind turbine generator, a wind turbine generator system, and a power generation control method of a wind turbine generator that are capable of improving the power-generation capability and reducing the fatigue load on the windmill by acquiring a more accurate wind direction and providing it to the power generation control of the wind turbine generator, without increasing equipment costs.

BACKGROUND ART

Typically, in a wind turbine generator, wind speed and wind direction are measured using an anemometer and an anemoscope provided on a nacelle and are used as control parameters in operation control. However, since such wind speed and wind direction are measured at the downstream side of a rotor, the wind speed of the incoming wind is reduced and the wind direction drifts, thus causing a problem in the measurement accuracy.

Accordingly, for example, in a "wind turbine generator system" disclosed in Japanese Unexamined Patent Application, Publication No. HEI-11-159436, a Doppler radar employing radio waves is used to measure a wind vector from in front of the rotor of a wind turbine generator, the output value from the wind turbine generator is predicted from the wind vector, and output power control of a power generator at an electric-power system is carried out on the basis of the predicted output value.

[Patent Document 1]
Japanese Unexamined Patent Application, Publication No. HEI-11-159436

DISCLOSURE OF INVENTION

According to the technology disclosed in the above-described Patent Document 1, a wind vector in front of the wind turbine generator is measured using the Doppler radar to improve the measurement accuracy. However, such a Doppler radar, an ultrasound anemometer, etc. are expensive, and resulting in cost problems.

Even when an inexpensive anemometer provided downstream of the rotor is used for wind speed, a procedure for correction using the result of separately performed calibration has been proposed. However, correction has not been performed for wind direction. Therefore, in particular, when carrying out yaw-angle control in which the nacelle orientation is adjusted such that the blade rotating surfaces follow the wind direction, the blade rotating surfaces do not face the true wind direction since the wind direction data after drift is referenced, and thus, there is a possibility that sufficient output power cannot be achieved. Since continuous operation in a drifted state causes an increase in the windmill fluctuating load, this causes a situation that is undesirable from the viewpoint of maintaining soundness.

The present invention has been conceived in light of the problems described above, and an object thereof is to provide a wind turbine generator, a wind turbine generator system, and a power generation control method of a wind turbine generator that are capable of improving the power-generation capability and reducing the fatigue load on the windmill by acquiring a more accurate wind direction and by providing it to the power generation control of the wind turbine generator, without increasing costs.

To solve these problems, the present invention provides the following solutions.

A first aspect of the present invention provides a wind turbine generator having an anemometer and an anemoscope provided on a nacelle, and a yaw-angle controlling mechanism configured to control the orientation of the nacelle, the wind turbine generator including a data accumulation unit configured to sequentially accumulate data sets of a generated output power during operation of the wind turbine generator, an incoming wind speed estimated on the basis of a wind speed measured at the anemometer, and a wind direction deviation, which is the difference between a wind direction measured at the anemoscope and the orientation of the nacelle; an analyzing unit configured to carry out statistical analysis of the data accumulated by the data accumulation unit, to determine a distribution curve corresponding to the wind direction deviation of the generated output power at each incoming wind speed, to set the wind direction deviation corresponding to the peak of the distribution curve as a correction value of the anemoscope, and to store the correction value of the anemoscope for each incoming wind speed; and a control unit configured to correct the wind direction measured at the anemoscope with the correction value of the anemoscope for each incoming wind speed and to carry out power-generation control using the corrected wind direction as a control parameter.

According to this aspect, since correction of the wind direction is carried out on the basis of the accumulated data sequentially accumulated a more accurate wind direction can be acquired without increasing costs. Moreover, since power generation control is carried out using the corrected wind direction, the power-generation capability can be improved.

A second aspect of the present invention provides a wind turbine generator having an anemometer and an anemoscope provided on a nacelle, and a yaw-angle controlling mechanism configured to control the orientation of the nacelle, the wind turbine generator including a learning-mode control unit configured to operate, with the yaw-angle controlling mechanism, the wind turbine generator in a learning mode in which the orientation of the nacelle is changed, step by step, by a predetermined amount with respect to a target wind direction at predetermined time intervals to change a wind direction deviation, which is the difference between the target wind direction and the nacelle orientation; a data accumulation unit configured to sequentially accumulate data sets of a generated output power during operation of the wind turbine generator in the learning mode, an incoming wind speed estimated on the basis of a wind speed measured at the anemometer, and the wind direction deviation; an analyzing unit configured to carry out statistical analysis of the data accumulated by the data accumulation unit, to determine a distribution curve corresponding to the wind direction deviation of the generated output power at each incoming wind speed, to set the wind direction deviation corresponding to the peak of the distribution curve as a correction value of the anemoscope, and to store the correction value of the anemoscope for each incoming wind speed; and a control unit configured to correct, during normal operation, the wind direction measured at the anemoscope for each incoming wind speed with the correction value of the anemoscope and to carry out power-generation control using the corrected wind direction as a control parameter.

According to this aspect, since correction of the wind direction is carried out on the basis of the accumulated data sequentially accumulated a more accurate wind direction can be acquired without increasing costs. Moreover, since power generation control is carried out using the corrected wind direction, the power-generation capability can be improved. Furthermore, since data collection is carried out by separately providing operation control in the learning mode to forcefully change the wind direction deviation, the correction value of the anemoscope can be acquired in a shorter period of time.

In the above-described wind turbine generator, the control unit may include a yaw-angle control unit configured to output, to the yaw-angle controlling mechanism, a yaw angle command based on the corrected wind direction deviation obtained by adding the correction value of the anemoscope for each incoming wind speed to the wind direction deviation, which is the difference between the wind direction measured at the anemoscope and the orientation of the nacelle.

In this way, since yaw angle control is carried out using the correction wind direction, the power-generation capability can be improved, and the fatigue load on the windmill can be reduced.

In the above-described wind turbine generator, the data accumulation unit sequentially accumulates data may set the momentum around a tower shaft during operation, the electric power consumption of a yaw motor in the yaw-angle controlling mechanism, or an N-fold component of a rotational frequency in a power spectrum when FFT processing is carried out on the generated output power, the incoming wind speed, and the wind direction deviation, and the analyzing unit may carry out statistical analysis of the data accumulated by the data accumulation unit, may determine a distribution curve corresponding to the wind direction deviation of the momentum around the tower shaft corresponding to each incoming wind speed, the electric power consumption of the yaw motor, or the N-fold component of the rotational frequency in the power spectrum of the generated output power, may set the wind direction deviation corresponding to a peak or an under peak of the distribution curve as a correction value of the anemoscope, and may store the correction value of the anemoscope for each incoming wind speed.

A third aspect of the present invention provides a wind turbine generator system including a plurality of wind turbine generators, each having an anemometer and an anemoscope, each provided on a nacelle, and a yaw-angle controlling mechanism configured to control the orientation of the nacelle; and a central control apparatus configured to centrally control the operation of the plurality of wind turbine generators, wherein the central control apparatus includes a data accumulation unit configured to sequentially accumulate data sets of a generated output power during operation of a specific wind turbine generator or a plurality of specific wind turbine generators, an incoming wind speed estimated on the basis of a wind speed measured at the anemometer, and a wind direction deviation, which is the difference between a wind direction measured at the anemoscope and the orientation of the nacelle, and an analyzing unit configured to carry out statistical analysis of the data accumulated by the data accumulation unit, to determine a distribution curve corresponding to the wind direction deviation of the generated output power at each incoming wind speed, to set the wind direction deviation corresponding to the peak of the distribution curve as a correction value of the anemoscope, and to store the correction value of the anemoscope for each incoming wind speed, and wherein each of the wind turbine generators includes a control unit configured to correct the wind direction measured at the anemoscope for each incoming wind speed with the correction value of the anemoscope and to carry out power-generation control using the corrected wind direction as a control parameter.

A fourth aspect of the present invention provides a wind turbine generator system including a plurality of wind turbine generators, each having an anemometer and an anemoscope, each provided on a nacelle, and a yaw-angle controlling mechanism configured to control the orientation of the nacelle; and a central control apparatus configured to centrally control the operation of the plurality of wind turbine generators, wherein the central control apparatus includes a learning-mode control unit configured to operate a specific wind turbine generator or each of a plurality of specific wind turbine generators in a learning mode in which the orientation of the nacelle is changed, step by step, by a predetermined amount with respect to a target wind direction at predetermined time intervals by the yaw-angle controlling mechanism in the specific wind turbine generator or each of the plurality of specific wind turbine generators to change the wind direction deviation, which is the difference between the target wind direction and the nacelle orientation, a data accumulation unit configured to sequentially accumulate data sets of a generated output power during operation of the specific wind turbine generator or the plurality of specific wind turbine generators in the learning mode, an incoming wind speed estimated on the basis of a wind speed measured at the anemometer, and a wind direction deviation, and an analyzing unit configured to carry out statistical analysis of the data accumulated by the data accumulation unit, to determine a distribution curve corresponding to the wind direction deviation of the generated output power at each incoming wind speed, to set the wind direction deviation corresponding to the peak of the distribution curve as a correction value of the anemoscope, and to store the correction value of the anemoscope for each incoming wind speed, and wherein each of the wind turbine generators includes a control unit configured to correct the wind direction measured at the anemoscope with the correction value of the anemoscope for each incoming wind speed during normal operation and to carry out power-generation control using the corrected wind direction as a control parameter.

According to such a wind turbine generator system, since correction of the wind direction is carried out on the basis of the accumulated data sequentially accumulated during operation, a more accurate wind direction can be acquired without increasing costs. Moreover, since power generation control is carried out using the corrected wind direction, the power-generation capability can be improved.

In the above-described wind turbine generator system, the control unit may include a yaw-angle control unit configured to output, to the yaw-angle controlling mechanism, a yaw angle command based on the corrected wind direction deviation obtained by adding the correction value of the anemoscope for each incoming wind speed to the wind direction deviation, which is the difference between the wind direction measured at the anemoscope and the orientation of the nacelle.

Since yaw angle control is carried out using the corrected wind direction, the power-generation capability can be improved, and the fatigue load on the windmill can be reduced.

In the above-described wind turbine generator system, the data accumulation unit may sequentially store data sets of the momentum around a tower shaft during operation, the electric power consumption of a yaw motor in the yaw-angle controlling mechanism, or an N-fold component of a rotational frequency in a power spectrum when FFT processing is carried out on the generated output power, the incoming wind speed, and the wind direction deviation, and the analyzing unit may carry out statistical analysis of the data accumulated by the data accumulation unit, may determine a distribution curve corresponding to the wind direction deviation of the momentum around the tower shaft corresponding to each incoming wind speed, the electric power consumption of the yaw motor, or the N-fold component of the rotational frequency in the power spectrum of the generated output power, may set the wind direction deviation corresponding to the peak or the under peak of the distribution curve as a correction value of the anemoscope, and may store the correction value of the anemoscope for each incoming wind speed.

A fifth aspect of the present invention provides a power-generation controlling method of a wind turbine generator including an anemometer and an anemoscope provided on a nacelle, and a yaw-angle controlling mechanism configured to control the orientation of the nacelle, the method including a data accumulating step of sequentially accumulating data sets of a generated output power during operation of the wind turbine generator, an incoming wind speed estimated on the basis of a wind speed measured at the anemometer, and a wind direction deviation, which is the difference between a wind direction measured at the anemoscope and the orientation of the nacelle; an analyzing step of carrying out statistical analysis of the data accumulated in the data accumulating step, determining a distribution curve corresponding to the wind direction deviation of the generated output power at each incoming wind speed, setting the wind direction deviation corresponding to the peak of the distribution curve as a correction value of the anemoscope, and storing the correction value of the anemoscope for each incoming wind speed; and a controlling step of correcting the wind direction measured at the anemoscope with the correction value of the anemoscope for each incoming wind speed and carrying out power-generation control using the corrected wind direction as a control parameter.

According to this aspect, since correction of the wind direction is carried out on the basis of the accumulated data sequentially accumulated during operation, a more accurate wind direction can be acquired without increasing costs. Moreover, since power generation control is carried out using the corrected wind direction, the power-generation capability can be improved.

A sixth aspect of the present invention provides a power-generation controlling method of a wind turbine generator including an anemometer and an anemoscope provided on a nacelle, and a yaw-angle controlling mechanism configured to control the orientation of the nacelle, the method including a learning-mode control step of operating, with the yaw-angle controlling mechanism, the wind turbine generator in a learning mode in which the orientation of the nacelle is changed, step by step, by a predetermined amount with respect to a target wind direction at predetermined time intervals to change the wind direction deviation, which is the difference between the target wind direction and the nacelle orientation; a data accumulating step of sequentially accumulating data sets of a generated output power during operation of the wind turbine generator in the learning mode, an incoming wind speed estimated on the basis of a wind speed measured at the anemometer, and the wind direction deviation; an analyzing step of carrying out statistical analysis of the data accumulated by the data accumulation unit, determining a distribution curve corresponding to the wind direction deviation of the generated output power at each incoming wind speed, setting the wind direction deviation corresponding to the peak of the distribution curve as a correction value of the anemoscope, and storing the correction value of the anemoscope for each incoming wind speed; and a controlling step of correcting, during normal operation, the wind direction measured at the anemoscope with the correction value of the anemoscope for each incoming wind speed and carrying out power-generation control using the corrected wind direction as a control parameter.

According to this aspect, since correction of the wind direction is carried out on the basis of the accumulated data sequentially accumulated during operation, a more accurate wind direction can be acquired without increasing costs. Moreover, since power generation control is carried out using the corrected wind direction, the power-generation capability can be improved. Furthermore, since data collection is carried out by separately providing operation control in the learning mode to forcefully change the wind direction deviation, the correction value of the anemoscope can be acquired in a shorter period of time.

In the above-described power-generation control method, the controlling step may include a yaw-angle controlling step of outputting, to the yaw-angle controlling mechanism, a yaw angle command based on the corrected wind direction deviation obtained by adding the correction value of the anemoscope for each incoming wind speed to the wind direction deviation, which is the difference between the wind direction measured at the anemoscope and the orientation of the nacelle.

Since yaw angle control is carried out using the corrected wind direction, the power-generation capability can be improved, and the fatigue load on the windmill can be reduced.

In the above-described power-generation control method, in the data accumulating step, data sets of the momentum around a tower shaft during operation, the electric power consumption of a yaw motor in the yaw-angle controlling mechanism, or an N-fold component of a rotational frequency in a power spectrum when FFT processing is carried out on the generated output power, the incoming wind speed, and the wind direction deviation may be sequentially stored, and, in the analyzing step, statistical analysis of the data accumulated in the data accumulating step may be carried out, a distribution curve corresponding to the wind direction deviation of the momentum around the tower shaft corresponding to each incoming wind speed, the electric power consumption of the yaw motor, or the N-fold component of the rotational frequency in the power spectrum of the generated output power may be determined, the wind direction deviation corresponding to the peak or the under peak of the distribution curve may be set as a correction value of the anemoscope, and the correction value of the anemoscope for each incoming wind speed may be stored.

Since correction of the wind direction is carried out on the basis of the accumulated data sequentially accumulated a more accurate wind direction can be acquired without increasing costs.

Moreover, since power generation control is carried out using the corrected wind direction, the power-generation capability can be improved.

Furthermore, since yaw angle control is carried out using the corrected wind direction, advantages are afforded in that the power-generation capability can be improved and the fatigue load on the windmill can be reduced.

EXPLANATION OF REFERENCE SIGNS 2, 2-1 to 2-M: tower
3, 3-1 to 3-M: nacelle
5: anemometer
6: anemoscope
11: windmill rotor
12: windmill blade
14: gear box
15: power generating system
17: pitch-angle controlling mechanism
18: yaw-angle controlling mechanism
20, 130-1 to 130-M: control unit
21: generator-output-power control unit
22: pitch-angle control unit
23: yaw-angle control unit
24: incoming-wind-speed estimating unit
25, 125: data accumulation unit
26, 126: analyzing unit
27, 127: wind-direction correction table
128: learning-mode control unit
30: operation control unit
1-1 to 1-M: wind turbine generator
100: central control device
101: transceiver unit

BEST MODE FOR CARRYING OUT THE INVENTION

Embodiments of a wind turbine generator, a wind turbine generator system, and a power-generation control method of a wind turbine generator according to the present invention will be described in detail below with reference to the drawings.

First Embodiment

Figure 1:
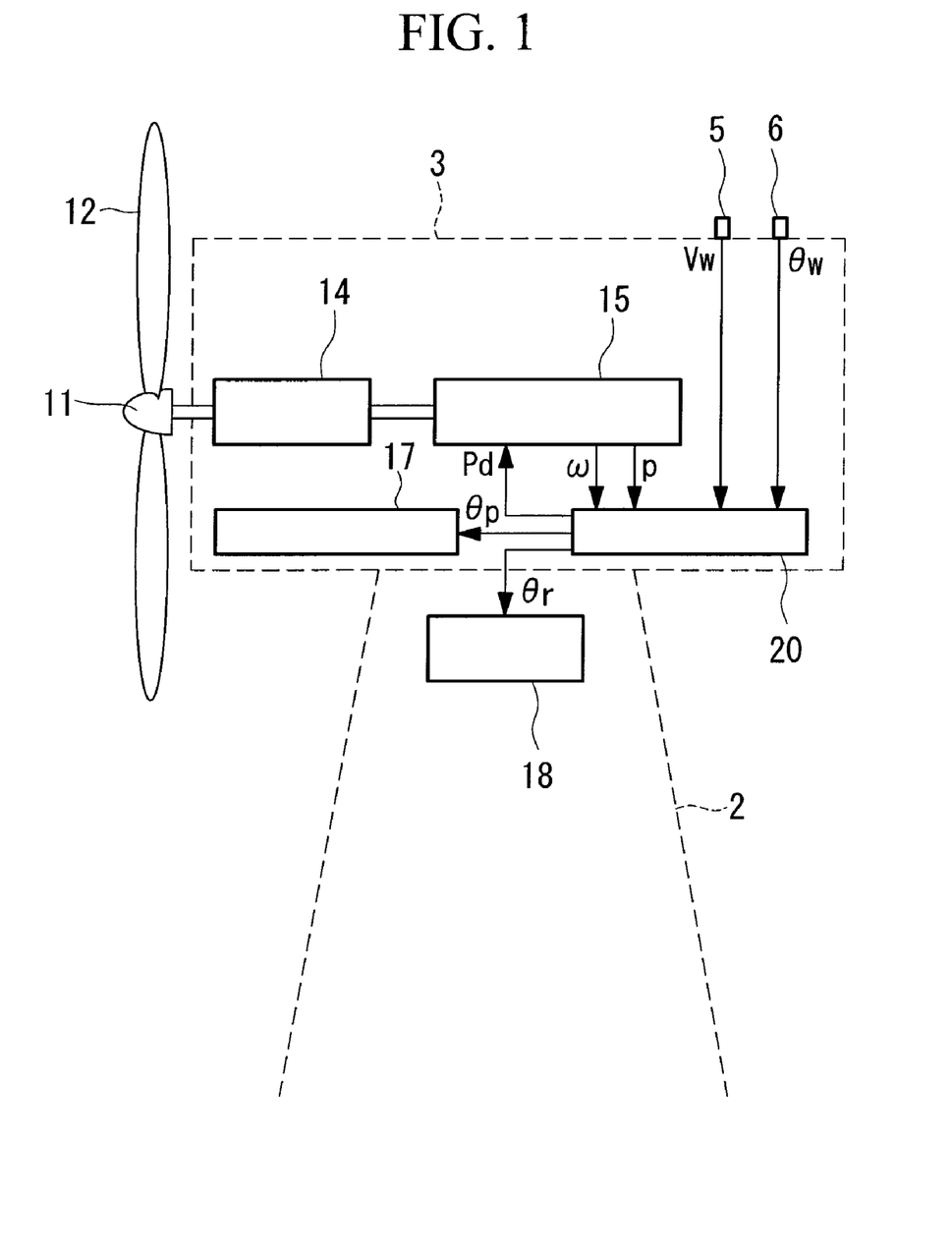
FIG. 1 is a schematic configuration diagram, in outline, of the entire wind turbine generator according to a first embodiment of the present invention.
Figure 2:
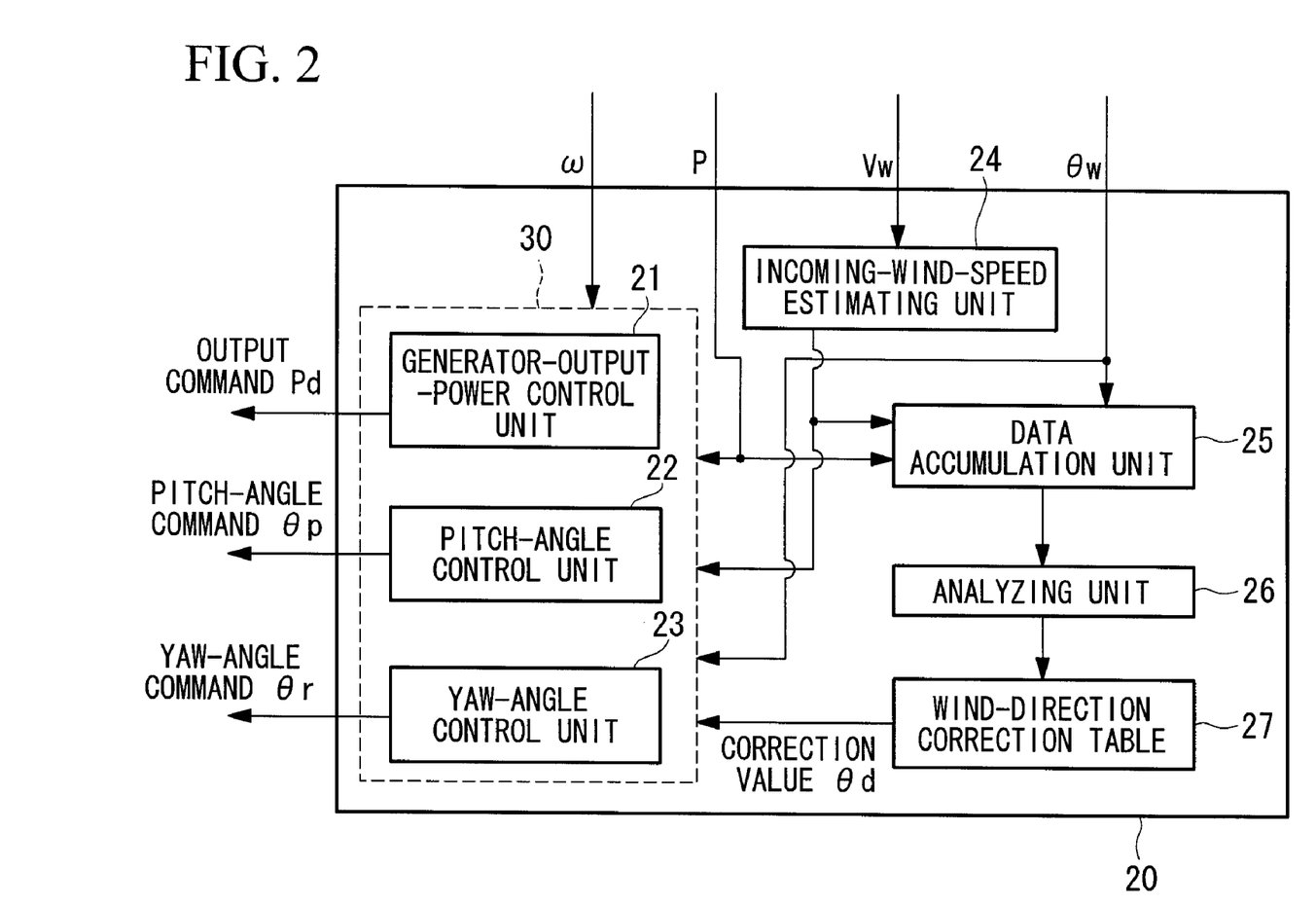
FIG. 2 is a detailed configuration diagram of a control device shown in FIG. 1.

FIGS. 1 and 2 are configuration diagrams of a wind turbine generator according to a first embodiment of the present invention. FIG. 1 is a schematic configuration diagram in outline. FIG. 2 is a detailed configuration diagram of a control device shown in FIG. 1.

In FIG. 1, the wind turbine generator according to the first embodiment is constructed of an anemometer 5, an anemoscope 6, a windmill rotor 11, a windmill blade 12, a gear box 14, a power generating system 15, a pitch-angle controlling mechanism 17, a yaw-angle controlling mechanism 18, and a control device 20. In the drawing, reference numeral 2 represents a tower, and reference numeral 3 represents a nacelle.

A plurality of windmill blades 12 attached to the windmill rotor 11 rotate together with the windmill rotor 11 by receiving wind energy. Then, after acceleration by the gear box 14, the wind energy is converted to electric energy by driving a power generator in the power generating system 15 to generate power. The wind turbine generator according to this embodiment is a variable-speed rotation control type wind turbine generator. As the power generator, a wound-rotor induction generator or a synchronous generator is used. In a configuration employing a synchronous generator, an AC-DC-AC link method is employed to temporarily convert the output power of the generator to a direct current and then to an alternating current again by an inverter.

The anemometer 5 and the anemoscope 6 are installed above the nacelle 3 and on the downstream side of the windmill blades 12. The pitch-angle controlling mechanism 17 controls the pitch angle of the windmill blades 12 on the basis of a pitch-angle command Op from a pitch-angle control unit 22 (see FIG. 2) of the control device 20. Its structure etc. is the same as the one according to the related art. The yaw-angle controlling mechanism 18 controls the orientation of the nacelle 3 on the basis of a yaw-angle command θy from a yaw-angle control unit 23 (see FIG. 2) of the control device 20. Its structure etc. is the same as the one according to the related art.

Next, as shown in FIG. 2, the control device 20 includes, as the main structure, an operation control unit 30, an incoming-wind-speed estimating unit 24, a data accumulation unit 25, an analyzing unit 26, and a wind-direction correction table 27. The operation control unit 30 is includes, as the main structure, a generator-output-power control unit 21, the pitch-angle control unit 22, and the yaw-angle control unit 23.

The incoming-wind-speed estimating unit 24 uses the result of calibration, carried out separately, to correct a wind speed Vw measured at the anemometer 5 and outputs the corrected wind speed as an incoming wind speed Ws.

The data accumulation unit 25 sequentially accumulates data sets of the generated output power P during operation of the wind turbine generator, the incoming wind speed Ws estimated on the basis of the wind speed Vw measured at the anemometer 5, and a wind direction deviation, which is the difference between the wind direction θw measured at the anemoscope 6 and the orientation of the nacelle 3.

The analyzing unit 26 carries out statistical analysis on the data accumulated by the data accumulation unit 25, determines a distribution curve corresponding to the wind direction deviations of the generated output power P at all incoming wind speed Ws, sets the wind direction deviation corresponding to the peak of the distribution curve as a correction value θd for the anemoscope 6 (see FIG. 1), and stores the correction value θd of the anemoscope 6 for each incoming wind speed Ws in the wind-direction correction table 27. The statistical analysis procedure for determining the distribution curve from the accumulated data is not particularly limited, and a commonly-used procedure may be employed.

The operation control unit (control unit) 30 corrects the wind direction measured at the anemoscope 6 with the correction value of the anemoscope for each incoming wind speed and carries out power-generation control using the corrected wind direction as a control parameter.

The generator-output-power control unit 21 may use a procedure according to the related art, such as feedback control or feed-forward control, and, for example, determines an optimal gain on the basis of air density ρ and outputs a power output command Pd instructing the amount of power generation based on the optimal gain and the generator rotational speed ω to the power generating system 15.

The pitch-angle control unit 22 may use a procedure according to the related art, and, for example, determines the pitch angle providing the maximum output for the incoming wind speed Ws, corrects this with the air density ρ, and outputs the corrected pitch angle as the pitch-angle command θp to the pitch-angle controlling mechanism 17.

The yaw-angle control unit 23 generates the yaw-angle command θy based on the corrected wind direction deviation acquired by adding the correction value θd of the anemoscope for each incoming wind speed Ws to the wind direction deviation, which is the difference between the wind direction θw measured at the anemoscope 6 and the orientation of the nacelle 3, and outputs the yaw-angle command θy to the yaw-angle controlling mechanism 18.

Figure 3:
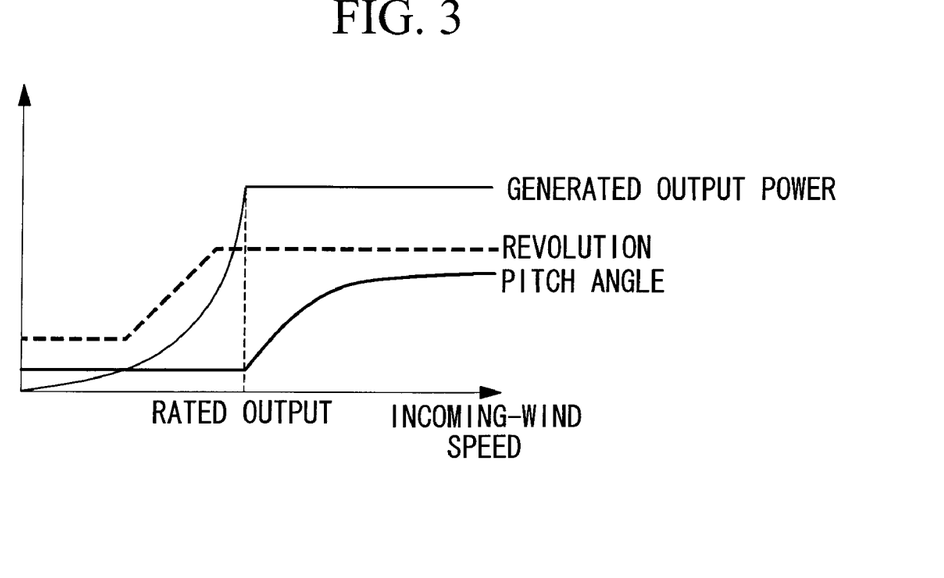
FIG. 3 is a diagram illustrating the changes in generated output power corresponding to an incoming wind speed, revolution, and a pitch angle.
Figure 4:
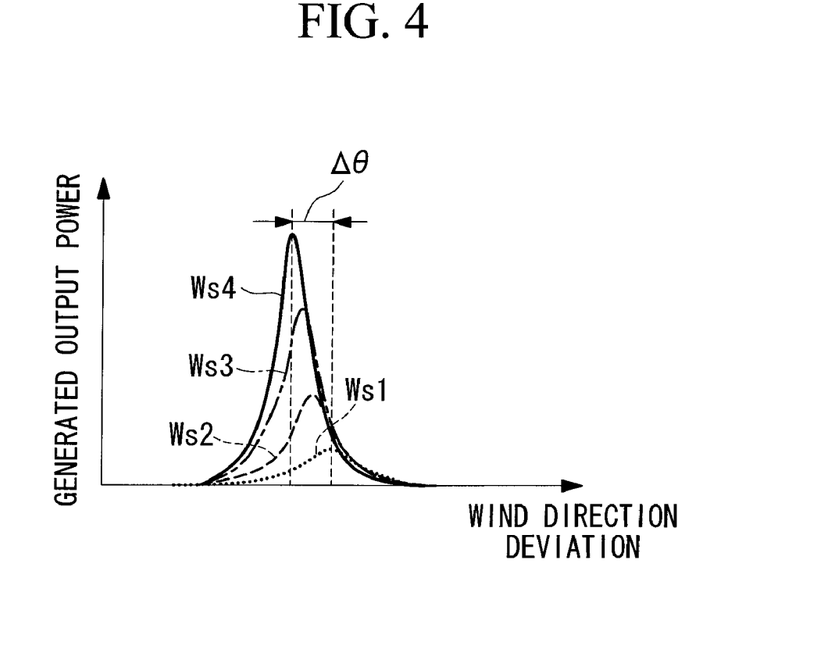
FIG. 4 is a diagram illustrating an example distribution curve of the wind direction deviations of generated output power of incoming wind speed.
Figure 5:
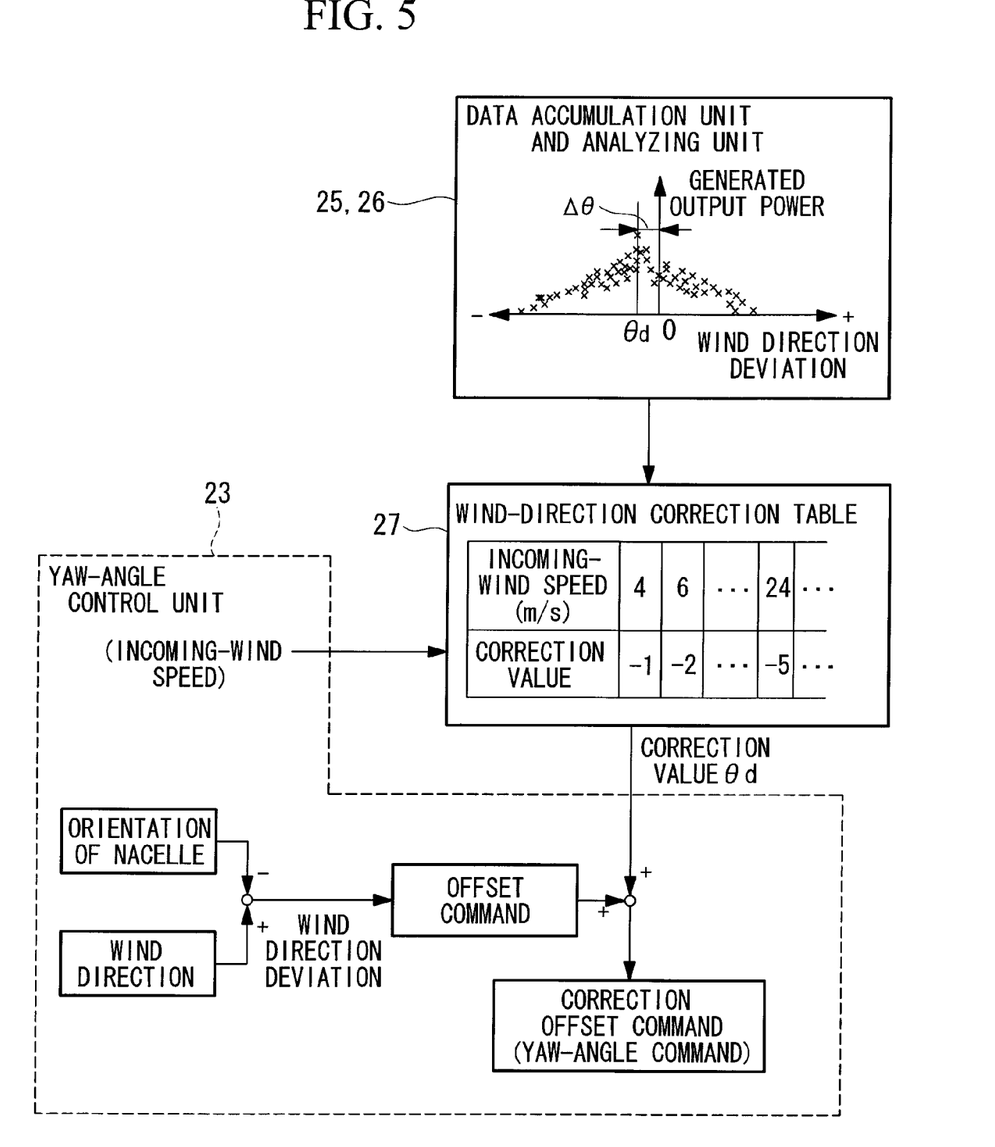
FIG. 5 is a diagram illustrating the creation of a wind-direction correction table by a data accumulation unit and an analyzing unit and yaw angle control by a yaw-angle control unit.

Next, a power-generation control method for the wind turbine generator according to this embodiment including the above-described components will be described with reference to FIGS. 3 to 5. Here, FIG. 3 is a diagram illustrating the changes in the generated output power P corresponding to the incoming wind speed, the revolution Ω, and the pitch angle θp. FIG. 4 is a diagram illustrating an example distribution curve of the wind direction deviations of generated output power P of incoming wind speed Ws1 to Ws4. FIG. 5 is a diagram illustrating the creation of the wind-direction correction table 27 by the data accumulation unit 25 and the analyzing unit 26 and yaw angle control by the yaw-angle control unit 23.

Typically, a wind turbine generator controls (yaw angle control) the orientation of the nacelle 3 in response to a change in the wind direction and provides control that enables stable and efficient power generation through controlling the rotational speed in response to a change in wind speed. As shown in FIG. 3, since the power generating capacity (rated output) of the wind turbine generator is limited, when wind exceeding a certain speed blows, the power generating output (rotational speed) has to be controlled, and thus rotational speed control is carried out by controlling the pitch angle of the windmill blades 12. In other words, control of the generated output power is carried out by performing pitch angle control such that the power generation efficiency improves when there is relatively weak wind, not reaching the rated output, and such that the power generation efficiency lowers when there is relatively strong wind reaching the rated output.

As described above, in yaw angle control, the rotating surfaces of the windmill blades 12 follow the wind direction by adjusting the orientation of the nacelle 3, but since this is based on the wind speed measured at the anemoscope 6 installed on the downstream side of the windmill blades 12, i.e., the drifted wind direction, the rotating surfaces of the windmill blades 12 do not face the true wind direction.

In other words, as shown in FIG. 4, in the distribution curve corresponding to the wind direction deviation of the generated output power for the incoming wind speed Ws4, the wind direction deviation at the peak of the generated output power is not zero; for example, it differs by Δθ in the minus direction. Since the generated output power is largest when the rotating surface of the windmill blades 12 face the true wind direction, the difference Δθ of the wind direction deviation is the error of the anemoscope 6 due to drift wind and can be regarded as an offset. As shown in FIG. 4, since the effect due to drift wind becomes large as the incoming wind speed Ws increases, the difference Δθ of the wind direction deviation becomes large as the incoming wind speed Ws increases.

Next, a detailed description will be provided with reference to FIG. 5. The data accumulation unit 25 sequentially accumulates data sets of the generated output power P during operation of the wind turbine generator, the incoming wind speed Ws estimated by the incoming-wind-speed estimating unit 24, and the wind direction deviations, which are the differences between the wind directions θw measured at the anemoscope 6 and the orientation of the nacelle 3. By plotting the accumulated data for an incoming wind speed on a plane of generated output power P versus wind direction deviation, a distribution such as that shown in the framed diagram is acquired. The distribution curve following this distribution is determined by statistical analysis performed by the analyzing unit 26, and the wind direction deviation (difference Δθ) corresponding to the peak of the distribution curve is set as the correction value θd of the anemoscope 6. This series of processing is carried out for each incoming wind speed Ws, and the correction value θd of the anemoscope 6 corresponding to each incoming wind speed Ws is stored in the wind-direction correction table 27.

The yaw-angle control unit 23 refers to the wind-direction correction table 27 on the basis of the (current) incoming wind speed Ws output from the incoming-wind-speed estimating unit 24 to acquire the correction value θd for the anemoscope 6.

At the same time, the wind direction deviation is determined by calculating the difference between the wind direction θw measured at the anemoscope 6 and the orientation of the nacelle 3 and is set as an offset command. The wind direction deviation corrected by adding the correction value θd of the anemoscope to the offset command is output as a correction offset command (yaw-angle command θy) to the yaw-angle controlling mechanism 18.

As described above, with the wind turbine generator and the power-generation control method of the wind turbine generator according to this embodiment, the data accumulation unit 25 sequentially accumulates data sets of the generated output power P during operation of the wind turbine generator, the incoming wind speed Ws estimated on the basis of the wind speed measured at the anemometer 5, and a wind direction deviation, which is the difference between the wind direction θw measured at the anemoscope 6 and the orientation of the nacelle 3, carries out statistical analysis of the accumulated data by the analyzing unit 26, and determines the distribution curve corresponding to the wind direction deviation of the generated output power at each incoming wind speed.

Moreover, the wind direction deviation corresponding to the peak of the distribution curve is set as the correction value θd of the anemoscope 6, the correction value of the anemoscope for each incoming wind speed is stored in the wind-direction correction table 27, the wind speed Vw of the anemoscope 6 is corrected by the correction value θd of the anemoscope for each incoming wind speed Ws at the operation control unit 30, and power-generation control is carried out by using the corrected wind direction as a control parameter.

In particular, the yaw-angle control unit 23 of the operation control unit 30 outputs to the yaw-angle controlling mechanism 18 the yaw-angle command θy based on the corrected wind direction deviation acquired by adding the correction value θd of the anemoscope 6 for the incoming wind speed Ws to the wind direction deviation, which is the difference between the wind direction measured at the anemoscope 6 and the orientation of the nacelle 3.

In this way, since correction of the wind direction is carried out on the basis of accumulated data sequentially accumulated during operation, the cost of the apparatus is not increased, and a more accurate wind direction is acquired. Since yaw angle control is carried out using the correction wind direction, the power-generation capability can be improved, and the fatigue load on the windmill can be reduced.

The magnitude of the drift wind, which is the cause of the error of the anemoscope 6, may be affected not only by the wind turbine generator main body, but also by the incoming wind speed, the topography of the site surroundings, and/or the surrounding wind turbine generators, depending on the installation conditions. Therefore, the offset of the anemoscope 6 changes sequentially, and thus optimal pre-adjustment is difficult. Thus, by periodically repeating the analyzing unit 26 at a predetermined cycle, the wind-direction correction table 27 can constantly hold an optimal correction value, and the power-generation capability can continue to be improved.

Second Embodiment

Next, a wind turbine generator and a power-generation control method of a wind turbine generator according to a second embodiment of the present invention will be described. The configuration of the wind turbine generator according to the second embodiment is substantially the same as the configuration of the above-described wind turbine generator, etc. according to the first embodiment but differs in that a learning-mode control unit is provided in the control device 20.

In the first embodiment, creation and update of the wind-direction correction table 27 is carried out during operation, whereas in the wind turbine generator and the power-generation control method of the wind turbine generator according to this embodiment, the wind-direction correction table 27 is created by carrying out operation in a learning mode, different from the normal operation.

In other words, in the learning-mode control unit, the yaw-angle controlling mechanism 18 operates the wind turbine generator in the learning mode in which the orientation of the nacelle 3 is changed, step by step, by a predetermined amount with respect to a target wind direction at predetermined time intervals to change the wind direction deviation, which is the difference between the target wind direction and the orientation of the nacelle 3.

The data accumulation unit 25 sequentially accumulates data sets of the generated output power P during operation of the wind turbine generator in the learning mode, the incoming wind speed Ws estimated on the basis of the wind speed measured at the anemometer 5, and the wind direction deviation. Similar to the first embodiment, the analyzing unit 26 carries out statistical analysis on the accumulated data, determines a distribution curve for the wind direction deviations of the generated output power P at all incoming wind speeds Ws, sets the wind direction deviation corresponding to the peak of the distribution curve as a correction value θd of the anemoscope, and stores the correction value of the anemoscope for each incoming wind speed in the wind-direction correction table 27.

Figure 6:
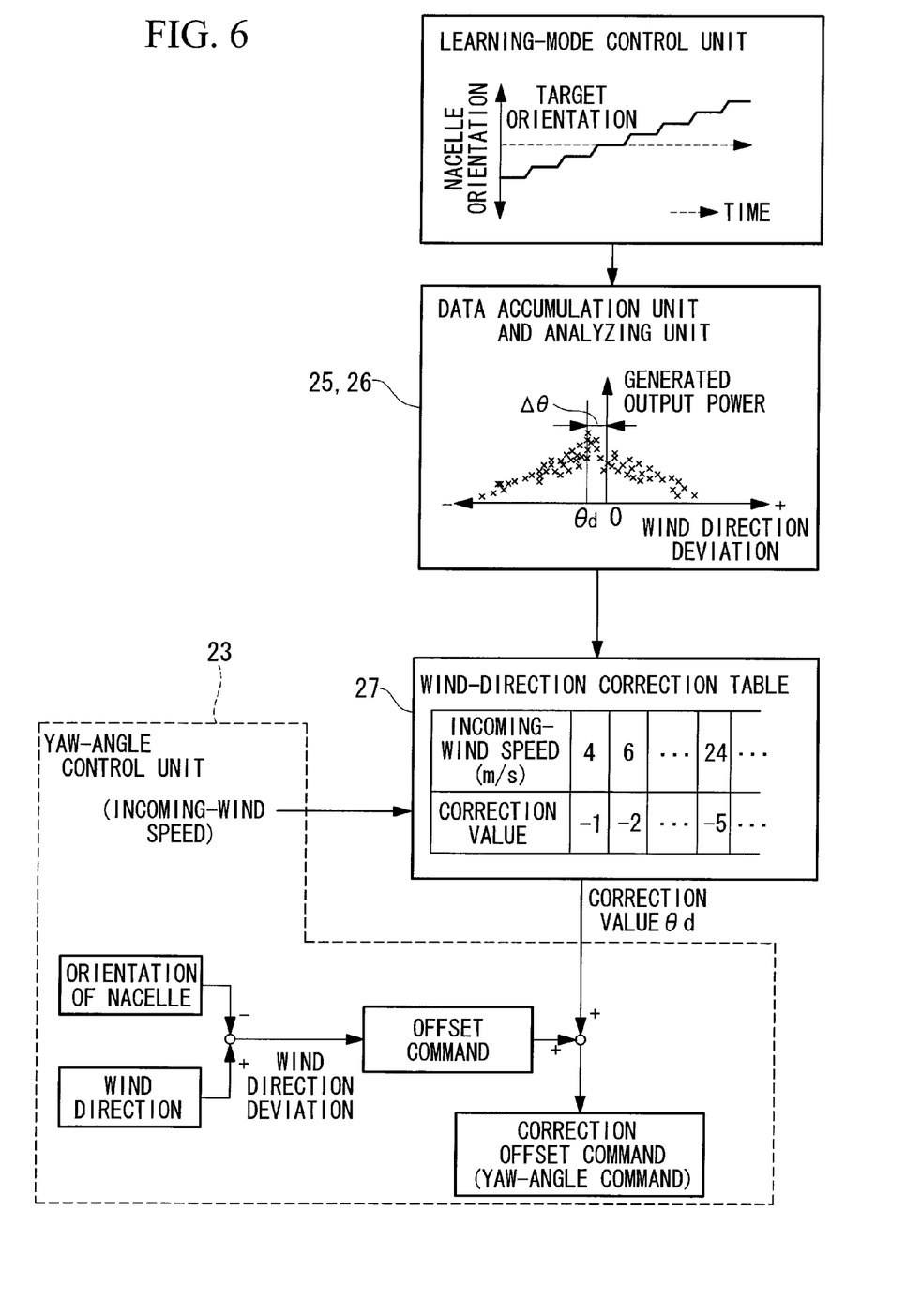
FIG. 6 is a diagram illustrating the creation of the wind-direction correction table by the data accumulation unit and the analyzing unit and yaw angle control by the yaw-angle control unit.

Next, a power-generation control method of the wind turbine generator according to this embodiment will be described with reference to FIG. 6. Here, FIG. 6 is a diagram illustrating the creation of the wind-direction correction table 27 by the data accumulation unit 25 and the analyzing unit 26, as well as yaw angle control by the yaw-angle control unit 23.

First, the learning-mode control unit operates the wind turbine generator in the learning mode, and the yaw-angle controlling mechanism 18 changes, step by step, the orientation of the nacelle 3 by a predetermined amount with respect to a target wind direction at predetermined time intervals to change the wind direction deviation, which is the difference between the target wind direction and the orientation of the nacelle 3.

Next, the data accumulation unit 25 sequentially accumulates data sets of the generated output power P during learning mode operation of the wind turbine generator, the incoming wind speed Ws estimated by the incoming-wind-speed estimating unit 24, and the wind direction deviation, which is the difference between the wind direction θw measured at the anemoscope 6 and the orientation of the nacelle 3.

By plotting the accumulated data for incoming wind speed on a plane of generated output power P versus wind direction deviation, a distribution such as that shown in the framed diagram is acquired. The distribution curve following this distribution is determined by statistical analysis performed by the analyzing unit 26, and the wind direction deviation (difference Δθ) corresponding to the peak of the distribution curve is set as the correction value θd of the anemoscope 6. This series of processing is carried out for all incoming wind speeds Ws, and the correction value θd of the anemoscope 6 corresponding to each incoming wind speed Ws is stored in the wind-direction correction table 27.

The yaw-angle control unit 23 refers to the wind-direction correction table 27 on the basis of the (current) incoming wind speed Ws output from the incoming-wind-speed estimating unit 24 to acquire the correction value θd of the anemoscope 6. At the same time, the wind direction deviation is determined by calculating the difference between the wind direction θw measured at the anemoscope 6 and the orientation of the nacelle 3, and this is set as an offset command. The wind direction deviation corrected by adding the correction value θd of the anemoscope to the offset command is output as a correction offset command (yaw-angle command θy) to the yaw-angle controlling mechanism 18.

It is preferable to carry out yaw angle control by the yaw-angle control unit 23 for a certain amount of time after creating the wind-direction correction table 27 in the learning mode and to confirm whether or not the correction offset command (yaw-angle command θy) is substantially zero. If it is substantially zero, the learning mode can be ended since an accurate wind-direction correction table 27 is acquired. However, if it is not zero, the creation of the wind-direction correction table 27 in the learning mode is carried out again since an accurate wind-direction correction table 27 is not acquired.

As described above, in the wind turbine generator and the power-generation control method of the wind turbine generator according to this embodiment, the learning-mode control unit uses the yaw-angle controlling mechanism 18 to change, step by step, the orientation of the nacelle 3 by a predetermined amount with respect to a target wind direction at predetermined intervals; the wind turbine generator is operated in the learning mode in which the wind direction deviation, which is the difference between the target wind direction and the orientation of the nacelle 3, is changed; and the data accumulation unit 25 sequentially accumulates data sets of the generated output power P during operation of the wind turbine generator in the learning mode, the incoming wind speed Ws estimated on the basis of the wind speed measured at the anemometer 5, and the wind direction deviation, which is the difference between the wind direction θw measured at the anemoscope 6 and the orientation of the nacelle 3.

Then, statistical analysis of the accumulated data is carried out by the analyzing unit 26; a distribution curve corresponding to the wind direction deviation of the generated output power for each incoming wind speed is determined; the wind direction deviation corresponding to the peak of the distribution curve is set as the correction value θd of the anemoscope 6; the correction value of the anemoscope for each incoming wind speed is stored in the wind-direction correction table 27; the operation control unit 30 corrects the wind speed Vw measured at the anemoscope 6 with the correction value θd of the anemoscope for each incoming wind speed Ws; and power generation control is carried out by using the corrected wind direction as a control parameter.

In particular, the yaw-angle control unit 23 of the operation control unit 30 outputs to the yaw-angle controlling mechanism 18 the yaw-angle command θy based on the corrected wind direction deviation acquired by adding the correction value θd of the anemoscope 6 for each incoming wind speed Ws to the wind direction deviation, which is the difference of the wind direction measured at the anemoscope 6 and the orientation of the nacelle 3.

In this way, since correction of the wind direction is carried out on the basis of accumulated data sequentially accumulated in the learning mode, the cost of the apparatus is not increased, and a more accurate wind direction can be acquired. Since yaw angel control is carried out using the corrected wind direction, the power-generation capability can be improved, and the fatigue load on the windmill can be reduced.

Since data collection is carried out by forcefully changing the wind direction deviation by providing a separate operation control in the learning mode, required data can be accumulated in a shorter period of time compared with the first embodiment in which data collection is carried out naturally. Therefore, the wind-direction correction table 27 can be created in a short period of time. In particular, this is effective for initial configuration at site set-up.

Third Embodiment

Figure 7:
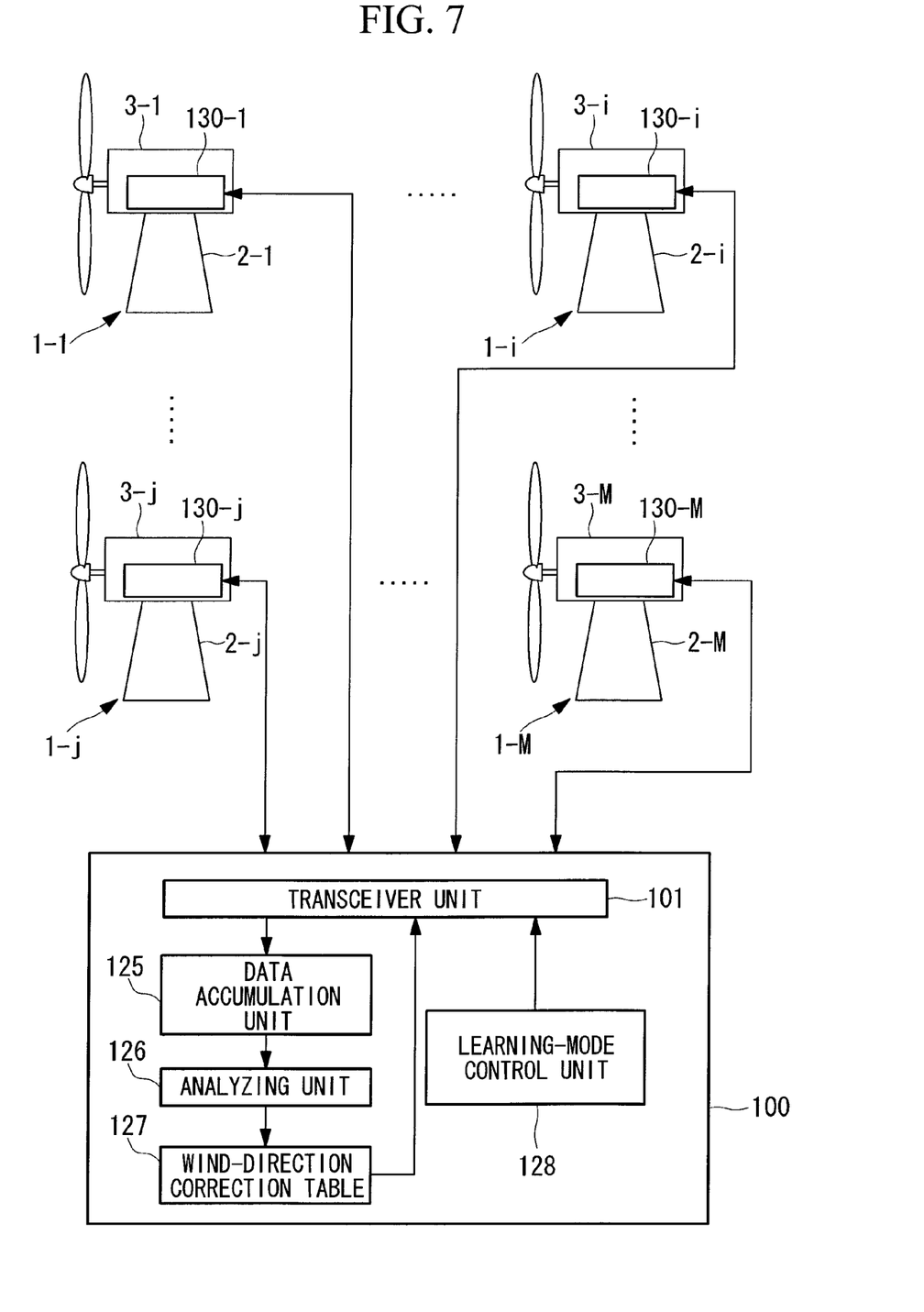
FIG. 7 is a configuration diagram of a wind turbine generator system according to a third embodiment of the present invention.

Next, FIG. 7 is a configuration diagram of a wind turbine generator system according to a third embodiment of the present invention. In FIG. 7, the wind turbine generator system according to this embodiment is a wind farm provided with M wind turbine generators 1-1 to 1-M and a central control apparatus 100 that centrally controls the operation of the M wind turbine generators 1-1 to 1-M.

The configuration, in outline, of each of the wind turbine generators 1-1 to 1-M is similar to that according to the first and second embodiments and is illustrated in FIG. 1. As a detailed configuration of control units 130-1 to 130-M, at least the incoming-wind-speed estimating unit 24 and the operation control unit 30, including the generator-output-power control unit 21 shown in FIG. 2, the pitch-angle control unit 22, and the yaw-angle control unit 23, may be provided, and other components are not required.

The central control apparatus 100 is provided with a transceiver unit 101, a data accumulating unit 125, an analyzing unit 126, a wind-direction correction table 127, and a learning-mode control unit 128.

In the wind turbine generator system according to this embodiment, the learning-mode control unit 128 of the central control apparatus 100 selects a specific wind turbine generator or a plurality of specific wind turbine generators. In the wind turbine generator, the yaw-angle controlling mechanism 18 operates the wind turbine generator in the learning mode in which the orientation of the nacelle is changed, step by step, by a predetermined amount with respect to a target wind direction at predetermined time intervals to change the wind direction deviation, which is the difference between the target wind direction and the orientation of the nacelle.

Then, the data accumulation unit 125 receives and sequentially accumulates data sets of the generated output power P during operation in the learning mode, the incoming wind speed Ws estimated on the basis of the wind speed measured at the anemometer 5, and the wind direction deviation from the specific wind turbine generator or the plurality of specific wind turbine generators. The analyzing unit 126 carries out statistical analysis of the accumulated data to determine a distribution curve corresponding to the wind direction deviation of the generated output power P for each incoming wind speed Ws. Moreover, the wind direction deviation corresponding to the peak of the distribution curve is set as a correction value of the anemoscope 6, and the correction value of the anemoscope 6 for each incoming wind speed is stored in the wind-direction correction table 127.

When data is collected by selecting a plurality of specific wind turbine generators, data sets sequentially received from the plurality of specific wind turbine generators are simply multiplexed to create one group of accumulated data. The operation control carried out by the control units 130-1 to 130-M (the operation control unit 30 provided with the generator-output-power control unit 21, the pitch-angle control unit 22, and the yaw-angle control unit 23) of the wind turbine generators 1-1 to 1-M is similar to that in the first and second embodiments. However, when referring to the wind-direction correction table, the wind-direction correction table 127 in the central control apparatus 100 is read out.

Since the data capacity of the wind-direction correction table is small, wind-direction correction tables may be provided in the control units 130-1 to 130-M of the wind turbine generators 1-1 to 1-M, and the wind-direction correction table 127 created by the central control apparatus 100 may be sent all at once to the wind turbine generators 1-1 to 1-M.

Typically, since in a wind farm, the wind turbine generators are arranged at constant intervals such that they are not affected by the surrounding wind turbine generators, the wind-direction correction table 127 can be created more efficiently by selecting one or a plurality of wind turbine generators.

In the above, embodiments of the present invention are described in detail with reference to the drawings. However, the detailed configuration is not limited to these embodiments, and design modification, etc. may be made within the scope of the invention.

For example, for the accumulated data, the momentum around the tower shaft may be used instead of the generated output power P. Moreover, for the accumulated data, the electric power consumption of the yaw motor in the yaw-angle controlling mechanism 18 may be used instead of the generated output power P. When such accumulated data is used, the analyzing unit 26 carries out statistical analysis of the data accumulated by the data accumulation unit 25, determines a distribution curve corresponding to the wind direction deviation of the momentum around the tower shaft or the electric power consumption of the yaw motor for each incoming wind speed, sets the wind direction deviation corresponding to the peak of the distribution curve as the correction value θd of the anemoscope 6, and stores the correction value of the anemoscope 6 for each incoming wind speed in the wind-direction correction table 27.

Moreover, for the accumulated data, an N-fold component of the rotational frequency in a power spectrum for when FFT processing is carried out on the generated output power may be used instead of the generated output power P. Here, N is the number of windmill blades 12. When N is three, a threefold component of the power spectrum of the rotational frequency is used. In such a case, the analyzing unit 26 carries out statistical analysis of the data accumulated by the data accumulation unit 25, determines a distribution curve corresponding to the wind direction deviation of the N-fold component of the rotational frequency in the power spectrum of the generated output power for each incoming wind speed, sets the wind direction deviation corresponding to the under peak of the distribution curve as the correction value θd of the anemoscope 6, and stores the correction value of the anemoscope 6 for each incoming wind speed in the wind-direction correction table 27.

The first to third embodiments are examples applied to a configuration of a variable-speed rotation control type wind turbine generator that independently carries out pitch angle control and generated output power control. However, any type may be used so long as the wind turbine generator has a configuration capable of accumulating data, such as the generated output power P corresponding to the wind direction θw and the wind speed Vw, and the momentum Mz around the tower shaft, or the electric power consumption of the yaw motor in the yaw-angle control mechanism, during operation (including test operation).

The invention claimed is:

1. A wind turbine generator system comprising:
   an anemometer and an anemoscope provided on a nacelle
   a yaw-angle controlling mechanism configured to control the orientation of the nacelle
   a data accumulation unit configured to sequentially accumulate data sets of a generated output power during operation of the wind turbine generator system, an incoming wind speed estimated on the basis of a wind speed measured at the anemometer, and a wind direction deviation, which is the difference between a wind direction measured at the anemoscope and the orientation of the nacelle;
   an analyzing unit configured to carry out statistical analysis of the data accumulated by the data accumulation unit, to determine a distribution curve corresponding to the wind direction deviation of the generated output power at each incoming wind speed, to set the wind direction deviation corresponding to the peak of the distribution curve as a correction value of the anemoscope, and to store the correction value of the anemoscope for each incoming wind speed; and
   a control unit configured to correct the wind direction measured at the anemoscope with the correction value of the anemoscope for each incoming wind speed and to carry out power-generation control using the corrected wind direction as a control parameter.

2. The wind turbine generator system according to claim 1, wherein the control unit includes a yaw-angle control unit configured to output, to the yaw-angle controlling mechanism, a yaw angle command based on the corrected wind direction deviation obtained by adding the correction value of the anemoscope for each incoming wind speed to the wind direction deviation, which is the difference between the wind direction measured at the anemoscope and the orientation of the nacelle.

3. The wind turbine generator system according to claim 1, wherein the data accumulation unit sequentially accumulates data sets of momentum around a tower shaft during operation, the electric power consumption of a yaw motor in the yaw-angle controlling mechanism, or an N-fold component of a rotational frequency in a power spectrum when FFT processing is carried out on the generated output power, the incoming wind speed, and the wind direction deviation, and
wherein the analyzing unit carries out statistical analysis of the data accumulated by the data accumulation unit, determines a distribution curve corresponding to the wind direction deviation of the momentum around the tower shaft corresponding to each incoming wind speed, the electric power consumption of the yaw motor, or the N-fold component of the rotational frequency in the power spectrum of the generated output power, sets the wind direction deviation corresponding to a peak or an under peak of the distribution curve as a correction value of the anemoscope, and stores the correction value of the anemoscope for each incoming wind speed.

4. The wind turbine generator system according to claim 1 comprising:
   a plurality of wind turbine generators; and
   a central control apparatus configured to centrally control the operation of the plurality of wind turbine generators,
   wherein the central control apparatus includes
      the data accumulation unit and
      the analyzing unit, and
   wherein each of the wind turbine generators includes
      the control unit.

5. A wind turbine generator system comprising:
   an anemometer and an anemoscope provided on a nacelle
   a yaw-angle controlling mechanism configured to control the orientation of the nacelle
   a learning-mode control unit configured to operate, with the yaw-angle controlling mechanism, the wind turbine generator system in a learning mode in which the orientation of the nacelle is changed, step by step, by a predetermined amount with respect to a target wind direction at predetermined time intervals to change a wind direction deviation, which is the difference between the target wind direction and the nacelle orientation;
   a data accumulation unit configured to sequentially accumulate data sets of a generated output power during operation of the wind turbine generator system in the learning mode, an incoming wind speed estimated on the basis of a wind speed measured at the anemometer, and the wind direction deviation;
   an analyzing unit configured to carry out statistical analysis of the data accumulated by the data accumulation unit, to determine a distribution curve corresponding to the wind direction deviation of the generated output power at each incoming wind speed, to set the wind direction deviation corresponding to the peak of the distribution curve as a correction value of the anemoscope, and to store the correction value of the anemoscope for each incoming wind speed; and
   a control unit configured to correct, during normal operation, the wind direction measured at the anemoscope for each incoming wind speed with the correction value of the anemoscope and to carry out power-generation control using the corrected wind direction as a control parameter.

6. The wind turbine generator system according to claim 5 comprising:
a plurality of wind turbine generators; and
a central control apparatus configured to centrally control the operation of the plurality of wind turbine generators,
wherein the central control apparatus includes
the learning-mode control unit,
the data accumulation unit, and
the analyzing unit, and
wherein each of the wind turbine generators includes
the control unit.

7. The wind turbine generator system according to claim 5, wherein the control unit includes a yaw-angle control unit configured to output, to the yaw-angle controlling mechanism, a yaw angle command based on the corrected wind direction deviation obtained by adding the correction value of the anemoscope for each incoming wind speed to the wind direction deviation, which is the difference between the wind direction measured at the anemoscope and the orientation of the nacelle.

8. The wind turbine generator system according to claim 5, wherein the data accumulation unit sequentially accumulates data sets of momentum around a tower shaft during operation, the electric power consumption of a yaw motor in the yaw-angle controlling mechanism, or an N-fold component of a rotational frequency in a power spectrum when FFT processing is carried out on the generated output power, the incoming wind speed, and the wind direction deviation, and
wherein the analyzing unit carries out statistical analysis of the data accumulated by the data accumulation unit, determines a distribution curve corresponding to the wind direction deviation of the momentum around the tower shaft corresponding to each incoming wind speed, the electric power consumption of the yaw motor, or the N-fold component of the rotational frequency in the power spectrum of the generated output power, sets the wind direction deviation corresponding to a peak or an under peak of the distribution curve as a correction value of the anemoscope, and stores the correction value of the anemoscope for each incoming wind speed.

* * * * *